(12) United States Patent
Swanson (10) Patent No.: US 9,510,078 B2
(45) Date of Patent: *Nov. 29, 2016

(54) WIRELESS EARPIECE WITH LOCAL AUDIO CACHE

(71) Applicant: Cirrus Logic, Inc., Austin, TX (US)

(72) Inventor: Eric J. Swanson, Buda, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/930,274

(22) Filed: Nov. 2, 2015

(65) Prior Publication Data

US 2016/0057523 A1 Feb. 25, 2016

Related U.S. Application Data

(63) Continuation of application No. 13/829,524, filed on Mar. 14, 2013, now Pat. No. 9,210,493.

(51) Int. Cl.
*H04R 1/10* (2006.01)
*G06F 17/30* (2006.01)
*H04R 5/033* (2006.01)

(52) U.S. Cl.
CPC .......... *H04R 1/1041* (2013.01); *G06F 17/3074* (2013.01); *H04R 1/1016* (2013.01); *H04R 5/033* (2013.01); *H04R 2420/07* (2013.01)

(58) Field of Classification Search
USPC ......................................................... 381/74
See application file for complete search history.

(56) References Cited

U.S. PATENT DOCUMENTS

| | | |
|---|---|---|
| 7,206,429 B1 | 4/2007 | Vossler |
| 7,548,040 B2 | 6/2009 | Lee et al. |
| 7,558,529 B2 | 7/2009 | Seshadri et al. |
| 2003/0050011 A1 | 3/2003 | Palermo et al. |
| 2004/0242264 A1 | 12/2004 | Cho |
| 2005/0107120 A1 | 5/2005 | Yueh |
| 2005/0130593 A1 | 6/2005 | Michalak |
| 2005/0208893 A1 | 9/2005 | Yueh |
| 2006/0166715 A1 | 7/2006 | Van Engelen et al. |
| 2007/0025194 A1 | 2/2007 | Morse et al. |
| 2007/0058819 A1 | 3/2007 | Hertz et al. |
| 2007/0079692 A1 | 4/2007 | Glatt |
| 2007/0154047 A1 | 7/2007 | Coyne et al. |
| 2007/0230736 A1 | 10/2007 | Boesen |
| 2008/0031475 A1 | 2/2008 | Goldstein |

(Continued)

OTHER PUBLICATIONS

Au et al., MicroLEAP: Energy-aware Wireless Sensor Platform for Biomedical Sensing Applications, pp. 158-162, IEEE, 2007.

*Primary Examiner* — Brenda Bernardi
(74) *Attorney, Agent, or Firm* — Norton Rose Fulbright US LLP (57) ABSTRACT

A wireless earpiece may include a local memory for storing audio files that can be played back by the user. The wireless earpiece may fit entirely within the user's ear canal. Audio files, for example music files, may be loaded on the wireless earpiece by docking the wireless earpiece with a mobile device, which includes a larger memory storing the user's library of music files. The stored audio files may be received from a mobile device that were automatically selected from a library of music files by the mobile device without intervention from the user. To provide stereo sound, two wireless earpieces may be worn by the user and docked separately with the mobile device. Each of the two wireless earpieces may store a single channel of an audio file, which is separated by the mobile device during synchronization.

31 Claims, 5 Drawing Sheets

(56) References Cited

U.S. PATENT DOCUMENTS

| | | |
|---|---|---|
| 2008/0049961 A1 | 2/2008 | Brindisi |
| 2008/0298606 A1 | 12/2008 | Johnson et al. |
| 2009/0063975 A1 | 3/2009 | Bull et al. |
| 2010/0042920 A1 | 2/2010 | Sigal |
| 2011/0170703 A1 | 7/2011 | Palma |
| 2013/0028434 A1 | 1/2013 | Sibbald et al. |
| 2014/0219467 A1 | 8/2014 | Kurtz |

WIRELESS EARPIECE WITH LOCAL AUDIO CACHE

CROSS-REFERENCE TO RELATED APPLICATIONS

This patent application is a continuation of U.S. patent application Ser. No. 13/829,524 to Eric J. Swanson filed on Mar. 14, 2013, and entitled "Wireless Earpiece with Local Audio Cache," which is incorporated by reference herein.

FIELD OF THE DISCLOSURE

The instant disclosure relates to audio devices. More specifically, this disclosure relates to wireless devices for music or other audio playback.

BACKGROUND

Today, despite advances in wireless technologies, a majority of music is still played back through conventional wired headphones. However, many wireless device users desire to have wireless devices for music playback. For example, athletes desire to listen to music without having a cord hanging around their necks during workouts. In another example, an office worker may desire to listen to music without reaching behind their computer to plug in wired headphones.

One problem with creating wireless headphones is the amount of information contained in music files. Even an average quality MPEG-1 layer 3 (MP3) audio file can contain one or more megabytes per minute of audio content. In comparison, an average web page loaded to a mobile device is approximately one tenth of a megabyte. If a user listens to music for a long duration of time, several hundred megabytes of data may be transferred per hour. In comparison, when transferring simple data, mobile phones rarely transfer that much data in an entire day.

This amount of information is difficult to process in a wireless earpiece because sending data consumes in excess of approximately 200 nanoJoules per bit. Thus, the transfer of hundreds of megabytes while listening to music files results in high power consumption within the wireless earpiece.

This high power consumption requires placement of a large battery within the wireless earpiece to allow the wireless earpiece to operate for the duration of an athlete's workout or an office worker's day. However, placement of a large battery in a wireless earpiece is difficult. A comfortable wireless earpiece should conform to the user's head and ear. At most, approximately 100 cubic millimeters of space are available for placement of a battery at the user's ear. For lithium-ion batteries, this size battery can provide only 10 milliWatts of power for two hours. This power consumption limitation makes wireless playback of music files difficult.

SUMMARY

A wireless earpiece may be configured with memory to store audio files, for example music files, for playback by the user. Storing audio files locally on the wireless earpiece decreases power consumption by reducing the amount of data transferred wirelessly during playback with the wireless earpiece. A wireless earpiece has limited volume within which a battery may be located. Because a battery may occupy a majority of the space in a wireless earpiece, the wireless earpiece may be significantly reduced in size as a result of reducing power consumption within the wireless earpiece.

The memory of the wireless earpiece may have a limited capacity for storing audio files, for example, music files. Keeping the memory size of the wireless earpiece small may allow reduction of the size of the wireless earpiece, because larger capacity memory chips may be larger in physical size. Because the memory of the wireless earpiece is limited, the memory of the wireless earpiece may function as a cache for selected music files the user may desire to listen to. The wireless earpiece may cache music files from a mobile device having a larger memory capacity. That is, a user may store all or a significant amount of their music files on their mobile device and synchronize a subset of the music files to the wireless earpiece. Synchronization of the wireless earpiece and the mobile device may occur through a docking interface. Synchronization of the wireless earpiece may occur through a wireless interface or a wired interface. Wireless data transfer while the wireless earpiece is docked may occur while the wireless earpiece is charging from the battery of the mobile device.

The wireless earpiece may be physically stored in the mobile device. When inserted in the mobile device, the wireless earpiece may charge from the mobile device's battery and may receive music files transferred from the mobile device's memory. In one embodiment, the mobile device and the wireless earpiece dock through a contact docking interface located inside the mobile device. In another embodiment, the mobile device and the wireless earpiece dock through a wireless docking interface located inside the mobile device. For example, wireless charging of the wireless earpiece from the mobile device's battery may be carried out through inductive charging, and wireless data transfer of music files from the mobile device's memory may be carried out according to the Bluetooth data protocol.

According to one embodiment, a wireless earpiece includes a memory for storing audio files received from a mobile device. The earpiece also includes a battery for storing energy received from a mobile device. The earpiece may further include a radio for receiving audio data from the mobile device. The earpiece also includes a speaker for generating audio from the music files.

In certain embodiments, the radio receives control data from the mobile device, the memory stores an intelligently-selected cache of music files, the intelligently-selected cache of music files comprises music files selected according to at least one of whether a song was recently played, whether an artist was recently played, and whether a genre was recently played, the wireless earpiece receives music files from the mobile device while receiving energy for the battery from the mobile device, the wireless earpiece docks inside of the mobile device for receiving music files and energy from the mobile device, the wireless earpiece wirelessly receives music files and energy from the mobile device, and/or the music files stored in the memory are stored uncompressed.

The wireless earpiece may also include a synchronization circuit for synchronizing the wireless earpiece with a second wireless earpiece, in which the wireless earpiece stores a first channel of the music files and the second wireless earpiece stores a second channel of the music files, and the synchronization circuit synchronizes playback of the first channel and the second channel by the wireless earpiece and the second wireless earpiece. The wireless earpiece may further include a digital signal processor for decompressing music files from the memory for playback by the speaker and/or a reference microphone for measuring ambient sound, in which the digital signal processor controls the speaker to cancel ambient sound.

According to another embodiment, a system includes a mobile device and a wireless earpiece. The mobile device includes a first battery, a first memory, and a first docking interface for transferring power and data to the wireless earpiece. The wireless earpiece includes a speaker, a second battery, a second memory, and a second docking interface for receiving power and data from the mobile device.

In certain embodiments, the mobile device includes a storage location for the wireless earpiece, such that when the wireless earpiece is inserted in the storage location the first docking interface couples to the second docking interface, the first docking interface and the second docking interface being configured to transfer music and data when the wireless earpiece is inserted in the storage location.

The system may also include a second wireless earpiece having a third docking interface configured to couple to the first docking interface of the mobile device, in which the second wireless earpiece includes a unique identifier for differentiating the second wireless earpiece from the wireless earpiece at the first docking interface, in which the wireless earpiece and the second wireless earpiece each receive one channel of a music file through the first docking interface.

According to yet another embodiment, a computer program product includes a non-transitory computer readable medium comprising code to execute the steps comprising identifying a wireless earpiece is docked with a mobile device, selecting music files for storage in a memory of the wireless earpiece, and transferring data of the selected music files to the wireless earpiece.

In certain embodiments, the medium further comprises code to execute the step of preparing the data for transfer to the wireless earpiece by reducing the selected music files to a single channel and/or the medium further comprises code to execute the step of preparing the data for transfer to the wireless earpiece by decompressing the selected music files.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Storing audio files, including music files, locally in a wireless earpiece reduces power consumption during playback of such files. For example, fetching a music file from a flash memory may consume less than one nanoJoule per bit. This is a significant reduction from the two hundred nanoJoules per bit consumed to transfer a bit through a radio. When approximately 10 milliWatts of power is available for a two-hour period, approximately seven milliWatts may be consumed to drive a speaker of the wireless earpiece. The three milliWatts of power remaining may be available for other functions, such as transfer of data over a radio, decompression of the music files, ambient noise microphones for noise reduction, and/or battery management. Reduced power consumption allows construction of a wireless earpiece with smaller profiles, because battery size may be reduced. Power consumption, and thus battery size, may be reduced by storing audio files rather than streaming audio files to allow construction of a wireless earpiece that fits entirely or substantially within a user's ear canal.

Figure 1:
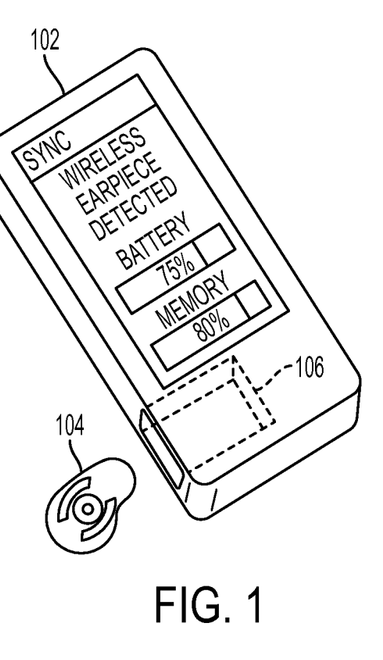
FIG. 1 is a diagram illustrating a wireless earpiece docking with a mobile device according to one embodiment of the disclosure.

FIG. 1 is a diagram illustrating a wireless earpiece docking with a mobile device according to one embodiment of the disclosure. A wireless earpiece 104 may dock with a mobile device 102 through a storage location 106 inside the mobile device 102. In other embodiments, storage location 106 may be external to mobile device 102, which may allow mobile device 102 to implement embodiments herein without substantial external design changes. When the wireless earpiece 104 is docked with the mobile device 102, the wireless earpiece 104 may receive power and data from the mobile device 102.

The wireless earpiece 104 may be inserted in or proximate to an ear by the user to listen to audio files. Although shown as a rectangular shape, the shape may vary in other embodiments. For example, many different earpiece shapes are commercially available; those designs, and modifications of those designs, would be within the realm of those having ordinary skill in the art with the benefit of this disclosure. For example, in one embodiment the wireless earpiece 104 may fit entirely in the user's ear canal. In another embodiment, the wireless earpiece 104 may be a wireless earpiece designed to be positioned over the user's ear canal and wrap around a back of the user's ear. In yet another embodiment, the wireless earpiece 104 may include a transducer that fits within the user's ear canal with a small piece extruding from the ear canal containing portions of the electronics for storing and/or processing audio files. In a further embodiment, the wireless earpiece 104 may be a wireless earpiece designed to wrap around the user's head to provide stereo sound to the user's ears. Control of the wireless earpiece 104 may be accessed from the mobile device 102 or, in other embodiments, from the wireless earpiece itself. For example, from the mobile device 102 the user may view music files loaded on the wireless earpiece 104, select a song for playback, adjust volume, and/or adjust playback speed. The user may also select to transfer data or stream data from the mobile device 102 to the wireless earpiece 104 over a wireless connection if the requested content is not already available on the wireless earpiece 104.

Figure 2:
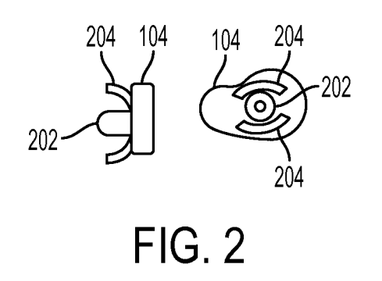
FIG. 2 is a side and top view of a wireless earpiece according to one embodiment of the disclosure.

FIG. 2 is a side and top view of a wireless earpiece according to one embodiment of the disclosure. A wireless earpiece 104 may include a speaker 202 and grips 204. The grips 204 affix the wireless earpiece 104 to a user's ear. According to one embodiment, the wireless earpiece 104 has a total size of approximately 100 cubic millimeters, allowing a majority of, or the entire, wireless earpiece 104 to fit within a user's ear.

Figure 3:
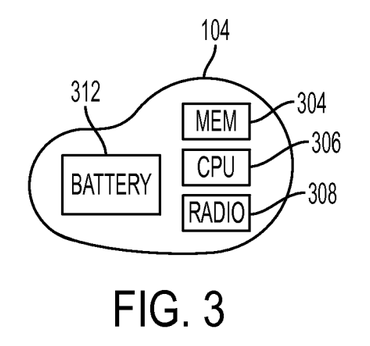
FIG. 3 is a block diagram of a wireless earpiece according to one embodiment of the disclosure.

FIG. 3 is a block diagram of a wireless earpiece according to one embodiment of the disclosure. A wireless earpiece 104 may include a battery 312, such as a lithium-ion battery. The battery 312 may also be any other energy source, such as a replaceable fuel cell. The wireless earpiece 104 may also include a memory 304, such as a flash memory. The memory 304 serves as a local cache for audio data, such as music files, received from the mobile device 102. The memory 304 may be, for example, a 64 GB or 128 GB multi-level cell (MLC) flash memory chip. The wireless earpiece 104 may further include a processor 306, such as a low-power ARM processor, a digital signal processor (DSP), and/or an earpiece coder-decoder (CODEC). Although one block is shown for the processor 306, the wireless earpiece 104 may include multiple processors, such as an ARM processor and a DSP. The wireless earpiece 104 may also include other control logic, such as a battery management processor.

The wireless earpiece 104 may also include a radio 308, such as a Bluetooth radio or a Zigbee radio. Although one block is shown for the radio 308, the radio 308 may include multiple radios, such as a Bluetooth radio and a Wi-Fi radio. In one embodiment, the radio is a Bluetooth radio, which may be integrated with an earpiece coder-decoder (CODEC) and flash memory management functions to further reduce the size of the wireless earpiece 104. For example, the components may be part of a stacked integrated circuit (IC). The radio 308 may be reduced to a low power state, or turned off, during playback of music files, because the music files are stored locally. In the low power state, the radio 308 may improve the battery life of the wireless earpiece 104, allowing for a reduction of the size of the battery 312. In the low power state, the radio 308 may occasionally check for control signals received from the mobile device 102.

In one embodiment, a wireless earpiece 104 may be manufactured with a smaller size by not including a radio. When no radio is present in the wireless earpiece 104, the wireless earpiece 104 may receive audio data from the mobile device 102 while docked with the mobile device 102. When the wireless earpiece 104 is removed from the mobile device 102 and inserted into the user's ear, the wireless earpiece 104 may begin playback of audio files according to an order selected by the user while the wireless earpiece 104 was docked with the mobile device 102. For example, the user may setup a playlist for synchronization of audio files between the wireless earpiece 104 and the mobile device 102, in which the playlist also specifies an order of playback. When the wireless earpiece 104 detects that it is removed from the mobile device 102, playback of the playlist may start. Detection by the wireless earpiece 104 that playback should start may be made by detecting the wireless earpiece 104 is no longer coupled through a docking interface or by a button on the wireless earpiece 104 activated by the user when the wireless earpiece 104 is placed in the user's ear.

In one embodiment, the wireless earpiece 104 may store compressed audio files in the memory 304. The compressed audio files allow the memory 304 of the wireless earpiece 104 to store more audio files than if the audio files were decompressed. For example, the compressed audio files may be MPEG-1 layer 3 (MP3) audio files. When the memory 304 stores compressed audio files, the processor 306 decompresses the audio files for playback through the speaker 202.

In another embodiment, the wireless earpiece 104 may store decompressed audio files in the memory 304. The processor 306 decodes the already-decompressed audio files for playback through the speaker 202. When the audio files are already decompressed, the processor 306 may be selected to have less processing capability, reducing the size of the processor 306. By reducing the size of the processor 306, additional space is available to increase the storage of the memory 304. Furthermore, a processor with less processing capability may consume less power, further lengthening the amount of playback available from the battery 312.

Although not shown, the wireless earpiece 104 may also include a microphone. The microphone may be positioned on the wireless earpiece 104 to receive audio signals from the user, such as voice commands and/or audio for a telephone call. Additionally, or alternatively, the microphone may be an error microphone for sensing noise in the environment around the user and allowing the processor 306 to provide noise cancellation.

Figure 4:
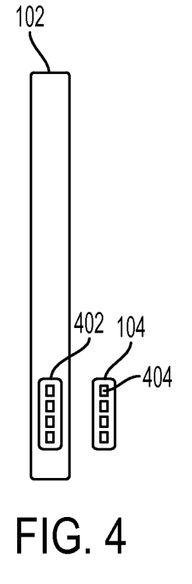
FIG. 4 is a diagram illustrating a docking interface for the mobile device and the wireless earpiece according to one embodiment of the disclosure.

A docking interface may couple the wireless earpiece 104 with the mobile device 104. FIG. 4 is a diagram illustrating a docking interface for the mobile device and the wireless earpiece according to one embodiment of the disclosure. For example, the wireless earpiece 104 may include a number of physical contacts 404. The mobile device 102 may include a matching number of physical contacts 402. There may be for example, four physical contacts including a power positive, a power negative, a data, and a ground physical contact. In other embodiments, docking may be achieved through a wired, or other proximate, connection such that contacts on mobile device 102 are not required.

Figure 5:
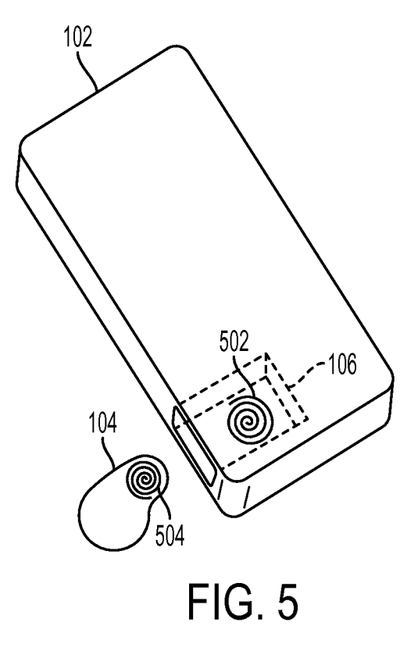
FIG. 5 is a diagram illustrating a docking interface for the mobile device and the wireless earpiece according to another embodiment of the disclosure.

The docking interface may also include wireless components. For example, either the power or the data or both may be transferred from the mobile device 102 to the wireless earpiece 104. FIG. 5 is a diagram illustrating a docking interface for the mobile device and the wireless earpiece according to another embodiment of the disclosure. The mobile device 102 may include an inductive coil 502 located near the storage location 106 for the wireless earpiece 104. Likewise, the wireless earpiece 104 may include an inductive coil 504 positioned on the wireless device 104 such that the inductive coil 504 aligns with the inductive coil 502 of the mobile device 102. Power may be transferred through the inductive coils 502 and 504 to allow charging of a battery within the wireless earpiece 104 from a battery of the mobile device 102.

Figure 6:
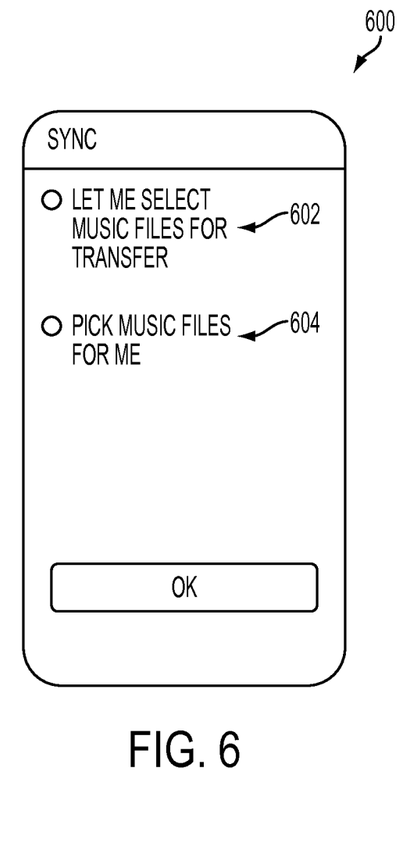
FIG. 6 is a screen shot illustrating a software interface for selecting a synchronization method for the wireless earpiece according to one embodiment of the disclosure.

When the docking interface couples the wireless earpiece 104 to the mobile device 102, software on the mobile device 102 may be activated to initiate management of the wireless earpiece 104. For example, the user of the mobile device 102 may be alerted when the wireless earpiece 104 is docked with the mobile device 102. FIG. 6 is a screen shot illustrating a software interface for selecting a synchronization method for the wireless earpiece according to one embodiment of the disclosure. A screen 600 may include an option 602 to allow a user of the mobile device 102 to select music files for transfer to the wireless earpiece 104 and an option 604 for the mobile device 102 to select music files for transfer to the wireless earpiece 104.

Figure 7:
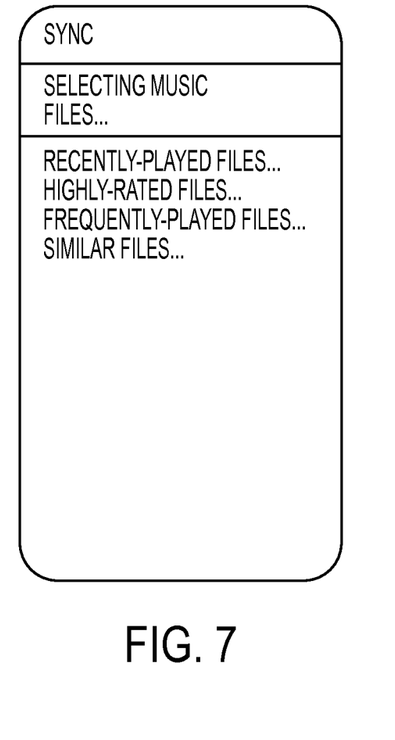
FIG. 7 is a screen shot illustrating software for selecting music files for synchronization to the wireless earpiece according to one embodiment of the disclosure.

When the user selects to have the mobile device 102 select music files for transfer to the wireless earpiece 104 a number of criteria may be used. FIG. 7 is a screen shot illustrating a software interface for selecting music files for synchronization to the wireless earpiece according to one embodiment of the disclosure. For example, music files may be selected based on files recently-played by the user or by previously defined playlists. This may include selecting files that are not recently-played by the user. In another example, music files may be selected based on high ratings by the user. That is, 4- and 5-star rated music files may be primarily selected. In a further example, frequently-played files may be selected based on a number of playbacks of a file compared to other files. This may include selecting files that are not frequently-played by the user. In yet another example, music files may be selected based on similarity to already picked music files. For example, if music files selected by the recently-played criteria discussed above are all classical music files, additional classical music files may be selected. This may include selecting files that are not similar to already-selected files.

Figure 8:
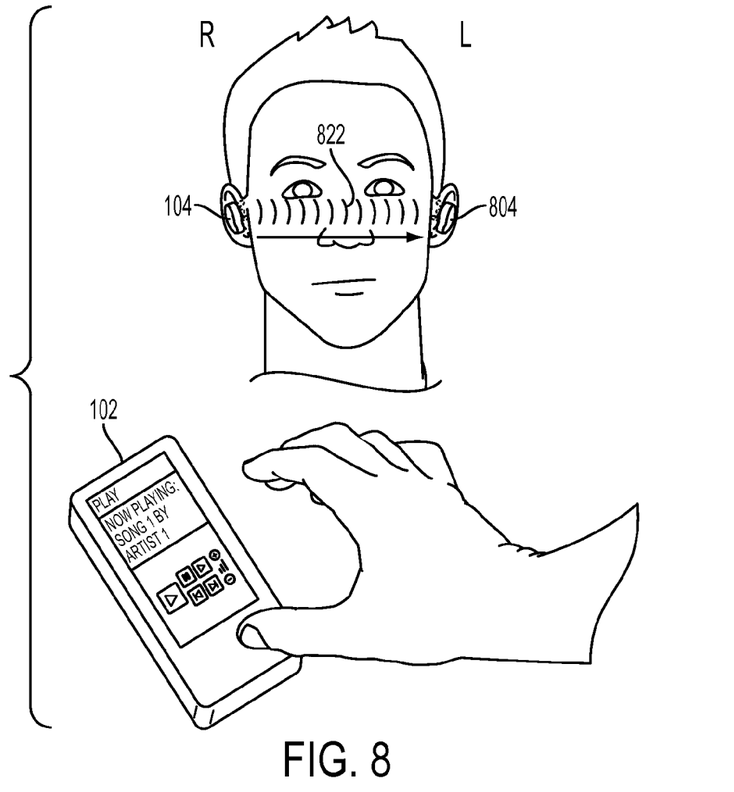
FIG. 8 is a diagram illustrating a music playback system having two wireless earpieces controlled by a mobile device according to one embodiment of the disclosure.

The wireless earpiece 104 may be combined with a second wireless earpiece 104 to create a stereo sound environment for the user. FIG. 8 is a diagram illustrating a music playback system having two wireless earpieces controlled by a mobile device according to one embodiment of the disclosure. A user may insert the wireless earpiece 104 in one ear and a wireless earpiece 804 in a second ear. The wireless earpieces 104 and 804 may synchronize through wireless synchronization signals 822. In one embodiment, the synchronization signals 822 may include a heartbeat message transmitted through Bluetooth. To reduce power consumption, an infrequent short message may be transmitted. For example, the heartbeat message may synchronize the wireless earpieces 104 and 804 to within half of one millisecond. In other embodiments, a wire may connect the wireless earpieces 104 and 804 for conveying information, including synchronization signals. The synchronization signals 822 provide information to the wireless earpieces 104 and 804 to allow coordinated playback of two channels, such as a left channel and a right channel, of a music file.

The wireless earpieces 104 and 804 may each include a memory for storing audio files. The memory of the wireless earpieces 104 and 804 may each store an entire audio file or store a portion of the audio file, such as a single stereo channel from the audio file. When each of the wireless earpieces 104 and 804 stores audio files, the wireless earpieces 104 and 804 may be individually docked with the mobile device 102.

Figure 9:
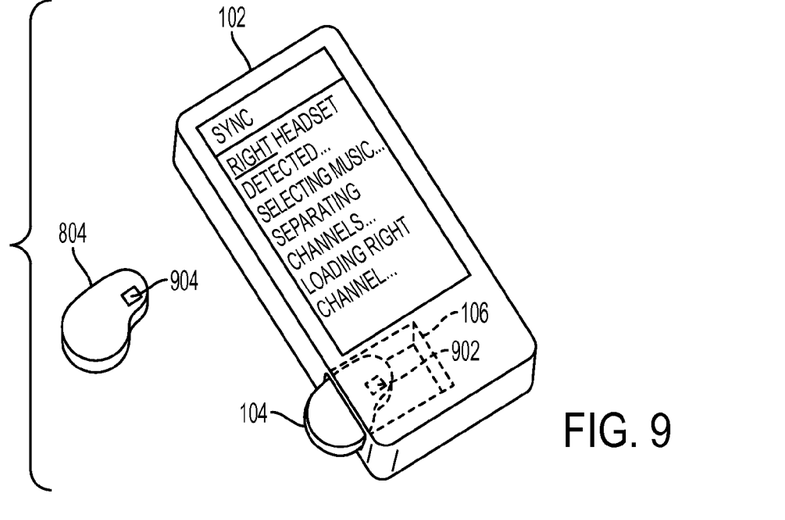
FIG. 9 is a diagram illustrating synchronizing two wireless earpieces with unique identifiers with a mobile device according to one embodiment of the disclosure.

FIG. 9 is a diagram illustrating synchronizing two wireless earpieces with unique identifiers with a mobile device according to one embodiment of the disclosure. A wireless earpiece 104 may be detected by the mobile device 102 when inserted in the storage location 106 and a connection is made through a docking interface. The wireless earpiece 104 may include a unique identifier 902 for identifying the wireless earpiece 104 from other wireless earpieces, such as the wireless earpiece 804. For example, the unique identifier 902 may be a serial number stored in memory and accessed by the mobile device 102. In another example, the unique identifier 902 may be a network media access control (MAC) address, such as the physical address of the Bluetooth radio. Likewise, the wireless earpiece 804 may include a unique identifier 904. Although not shown, the mobile device 102 may also include two storage locations, such as the storage location 106, to allow simultaneous synchronization and storage of the wireless earpieces 104 and 804. In other embodiments, storage locations may be external to mobile device 102.

Upon an initial connection of the wireless earpieces 104 and 804 with the mobile device 102, the user may specify a wireless earpiece as a left channel and right channel. The mobile device 102 may then automatically recognize a channel assigned to the wireless earpieces 104 and 804. When the wireless earpiece 104 or 804 are docked with the mobile device 102, the mobile device may select audio files, either manually by the user or automatically, for loading on the wireless earpiece 104 or 804. The audio files may be processed to separate channels of the music file. Then, a single channel, either the left channel or the right channel based on the user's initial assignment, may be loaded to the wireless earpiece 104 or 804.

Figure 10:
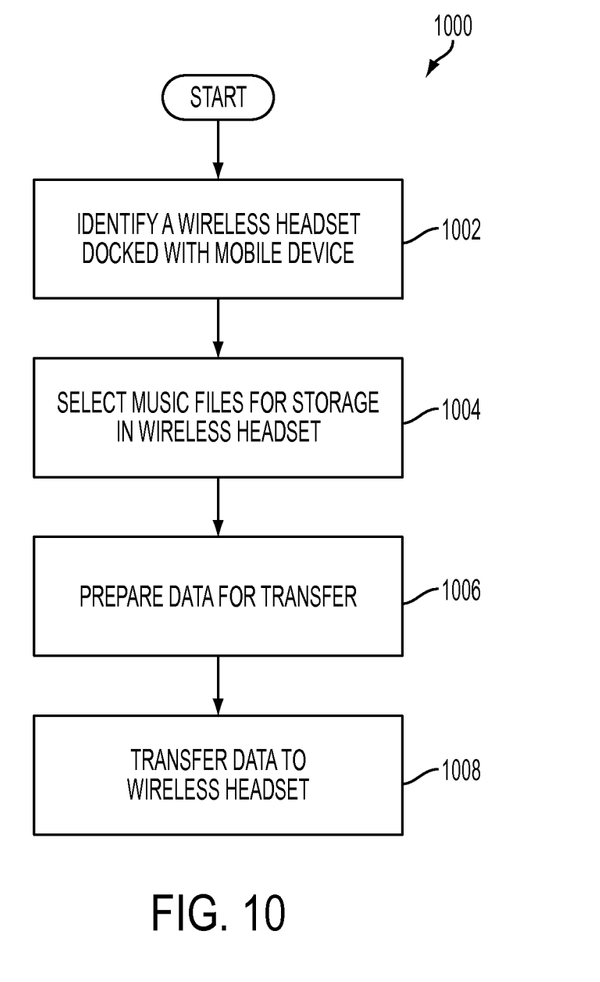
FIG. 10 is a flow chart illustrating a method of synchronizing a wireless earpiece with a mobile device according to one embodiment of the disclosure.

Software on the mobile device 102 may be executed to manage the wireless earpieces 104 and 804. For example, an app may be downloaded from an app store to the mobile device 102. The app may perform various function, such as executing one or more of the steps of the flow chart illustrated in FIG. 10. FIG. 10 is a flow chart illustrating a method of synchronizing a wireless earpiece with a mobile device according to one embodiment of the disclosure. A method 1000 may begin at block 1002 with identifying a wireless earpiece docked with the mobile device. That is, the app may detect a connection is made at a docking interface. The app may provide an indication to the user that the wireless earpiece is waiting for instructions or may begin synchronizing automatically in the background. Alternatively, the app may automatically launch to begin managing the wireless earpiece.

At block 1004, music files are selected for storage in the wireless earpiece. The music files may be selected automatically by an algorithm on the mobile device 102 according to, for example, the description accompanying FIG. 7 above. The user may also be provided an opportunity to manually select files or types of files for synchronization. In the event of a background synchronization with the wireless earpiece, the selected music files may be automatically selected by the mobile device without intervention from the user.

At block 1006, data is prepared for transfer to the wireless earpiece. For example, channels may be separated from the music files into individual files for loading onto separate wireless earpieces. In another example, music files may be decompressed for loading onto the wireless earpiece as uncompressed audio files. In a further example, the music files may be processed by an audio enhancement algorithm to enhance the quality of audio when played back on headphone-sized speakers present in the wireless earpiece. Other examples of data preparation may include normalization of volume levels and application of equalizer settings to provide different amplification levels and different frequency ranges.

At block 1008, the data is transferred to the wireless earpiece. The transfer may be through the docking interface, either wirelessly or wired. In a wired docking interface, the transfer may be through serial communication over a two contact connector or through parallel communication over three or more contact connectors. In a wireless docking interface, the transfer may be through a Bluetooth radio, WiFi radio, Zigbee radio, or other known wireless connection.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A wireless earpiece, comprising:
    a memory in the wireless earpiece and configured to store audio files received from a mobile device that were automatically selected from a library of music files by the mobile device without intervention from a user; and
    a speaker in the wireless earpiece and configured to reproduce audio based on content of the stored audio files,
    wherein the wireless earpiece is configured to couple to a power source.

2. The wireless earpiece of claim 1, further comprising a processor in the wireless earpiece, coupled to the memory and to the speaker, and configured to select an audio file from the stored audio files and generate signals that cause the speaker to reproduce audio from the selected audio file.

3. The wireless earpiece of claim 2, wherein the processor is a digital signal processor (DSP) and configured to process audio files from the memory for playback by the speaker.

4. The wireless earpiece of claim 3, further comprising a reference microphone configured to measure ambient sound, in which the digital signal processor (DSP) is coupled to the reference microphone and configured to control the speaker to reproduce the audio based, at least in part, on the stored audio files and an input from the reference microphone.

5. The wireless earpiece of claim 1, wherein the memory is configured to receive automatically selected files from a playlist for synchronization.

6. The wireless earpiece of claim 1, wherein the wireless earpiece is configured to store an intelligently-selected cache of audio files in the memory.

7. The wireless earpiece of claim 6, wherein the intelligently-selected cache of audio files comprises music files selected according to at least one of whether a song was recently played, whether an artist was recently played, and whether a genre was recently played.

8. The wireless earpiece of claim 1, wherein the wireless earpiece is configured to dock inside the mobile device while receiving audio files from the mobile device to be stored as the stored audio files in the memory.

9. The wireless earpiece of claim 8, wherein the wireless earpiece is configured to fit the speaker and the memory substantially within a user's ear.

10. The wireless earpiece of claim 1, further comprising a wireless radio coupled to the memory, in which the wireless earpiece is configured to wirelessly receive audio files from the mobile device through the wireless radio to be stored as the stored audio files in the memory.

11. The wireless earpiece of claim 1, wherein the audio files stored in the memory are uncompressed audio files.

12. The wireless earpiece of claim 11, further comprising a processor configured to decode the uncompressed audio files for playback through the speaker.

13. The wireless earpiece of claim 1, further comprising a radio configured to receive data from the mobile device, in which the radio is configured to receive control data from the mobile device.

14. The wireless earpiece of claim 13, further comprising a processor configured to control playback of the stored audio files in accordance with the received control data.

15. The wireless earpiece of claim 14, further comprising a second radio configured to receive data from a second wireless earpiece, and still further comprising a synchronization circuit coupled to the second radio and configured to synchronize the wireless earpiece with the second wireless earpiece.

16. The wireless earpiece of claim 15, wherein the wireless earpiece is configured to store only a first channel of two channels of the stored audio files and the second wireless earpiece is configured to store only a second channel of the two channels of the stored audio files, and wherein the synchronization circuit is configured to synchronize playback of the first channel and the second channel by the wireless earpiece and the second wireless earpiece.

17. A method, comprising:
- identifying a wireless earpiece is docked with a mobile device;
- automatically selecting audio files from a plurality of audio files for storage in a cache memory of the wireless earpiece without intervention from a user; and
- transferring data of the selected audio files to the wireless earpiece.

18. The method of claim 17, further comprising preparing the data for transfer to the wireless earpiece by reducing the selected audio files to a single channel.

19. The method of claim 17, further comprising preparing the data for transfer to the wireless earpiece by decompressing the selected audio files.

20. The method of claim 17, wherein the step of identifying the wireless earpiece comprises receiving a unique identifier, and wherein the method further comprises processing the selected audio files for transfer to the wireless earpiece based, at least in part, on the received unique identifier by reducing the selected audio files to a single channel selected based, at least in part, on the received unique identifier.

21. The method of claim 20, wherein the step of receiving a unique identifier comprises receiving a media access control (MAC) address of a Bluetooth radio of the wireless earpiece.

22. The method of claim 17, wherein the step of automatically selecting audio files comprises automatically selecting files from a user-defined playlist for synchronization.

23. The method of claim 17, wherein the step of automatically selecting audio files comprises intelligently-selecting audio files according to at least one of whether a song was recently played, whether an artist was recently played, and whether a genre was recently played.

24. The method of claim 23, further comprising:
- identifying the wireless earpiece is undocked from the mobile device; and
- controlling playback of the automatically selected audio files by the wireless earpiece.

25. A system, comprising:
- a mobile device comprising a first memory configured to store a plurality of audio files; and
- a wireless earpiece, comprising:
  - a speaker; and
  - a second memory configured to store cached audio files received from the mobile device that were automatically selected from the plurality of audio files by the mobile device without intervention from a user.

26. The system of claim 25, wherein the mobile device further comprises a first docking interface configured to transfer data to the wireless earpiece, and in which the wireless earpiece further comprises a second docking interface configured to receive data from the mobile device.

27. The system of claim 26, the mobile device configured to include a storage location for the wireless earpiece, such that when the wireless earpiece is inserted in the storage location the first docking interface couples to the second docking interface.

28. The system of claim 26, wherein the first docking interface and the second docking interface are configured to transfer data wirelessly.

29. The system of claim 26, further comprising a second wireless earpiece having a third docking interface configured to couple to the first docking interface of the mobile device.

30. The system of claim 29, wherein the second wireless earpiece comprises a unique identifier configured to differentiate the second wireless earpiece from the wireless earpiece at the first docking interface, the wireless earpiece and the second wireless earpiece each configured to receive one channel of an audio file through the first docking interface.

31. The system of claim 25, wherein the mobile device comprises a first battery and the wireless earpiece comprises a second battery, and wherein the wireless earpiece is configured to receive power from the mobile device for charging the second battery.

* * * * *